United States Patent [19]

Freppel

[11] 4,341,886

[45] Jul. 27, 1982

[54] PROCESS FOR PREPARING BIMODAL OR MULTIMODAL POLYMERS OF CONJUGATED DIENES

[75] Inventor: Christian Freppel, Chamalieres, France

[73] Assignee: Compagnie Generale des Etablissements Michelin, Clermont-Ferrand, France

[21] Appl. No.: 251,856

[22] Filed: Apr. 6, 1981

[30] Foreign Application Priority Data

Apr. 9, 1980 [FR] France .................................. 80 08111

[51] Int. Cl.³ .............................................. C08F 2/38
[52] U.S. Cl. ...................................... 526/79; 525/232; 525/236; 526/86; 526/66
[58] Field of Search .................... 526/79, 86, 335, 337, 526/340, 66

[56] References Cited

U.S. PATENT DOCUMENTS

| | | | |
|---|---|---|---|
| 4,016,347 | 4/1977 | Sommer et al. | 526/64 |
| 4,048,427 | 9/1977 | Hargis et al. | 526/337 |
| 4,079,176 | 3/1978 | DeZaranz | 526/177 |
| 4,080,492 | 3/1978 | DeZaranz | 526/177 |
| 4,092,268 | 5/1978 | DeZaranz | 252/430 |
| 4,129,705 | 12/1978 | DeZaranz | 526/175 |
| 4,212,718 | 7/1980 | Pinazzi et al. | 204/159.23 |

*Primary Examiner*—Stanford M. Levin
*Attorney, Agent, or Firm*—Brumbaugh, Graves, Donohue & Raymond

[57] ABSTRACT

A process of preparing a bimodal or multimodal homopolymer of a conjugated diene or a bimodal or multimodal copolymer of a conjugated diene with another conjugated diene or with a vinyl aromatic compound consists in polymerizing the monomer(s) in a reaction medium at a temperature of between 20° C. and 200° C. in the presence of a catalyst system comprising an organolithium initiator, a barium, strontium or calcium compound, and an organometallic compound of a metal of group 2B or 3A of the periodic classification of elements of the Mendeleev Table, and adding to the reaction medium during the course of the polymerization reaction a compound of a transition metal of groups 1B to 7B and 8 or a magnesium compound of the general formula $Mg(A)_2$.

10 Claims, 12 Drawing Figures

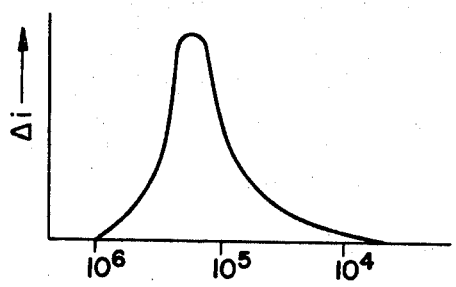
FIG. 1.1
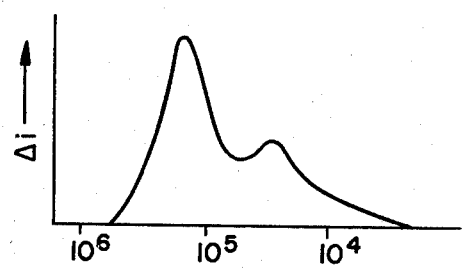
FIG. 1.2
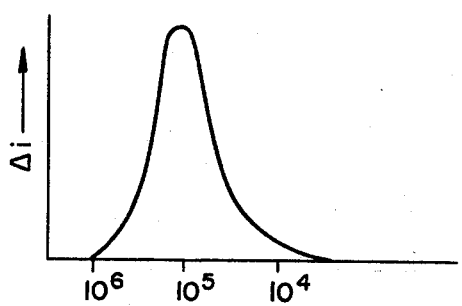
FIG. 3.1
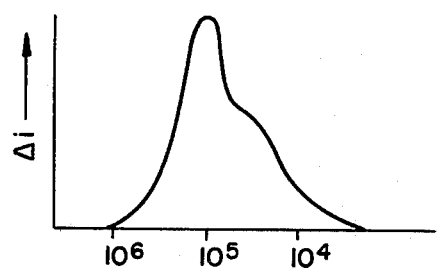
FIG. 3.2
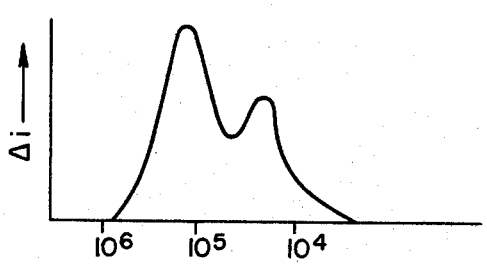
FIG. 3.3
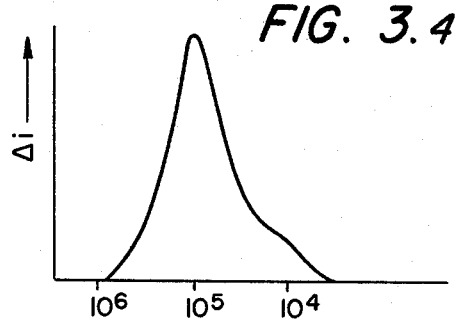
FIG. 3.4

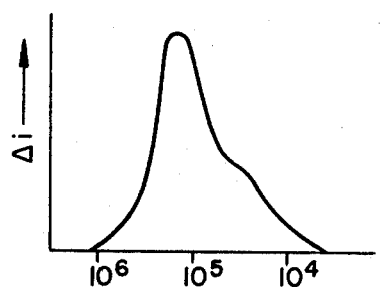
FIG. 2.1
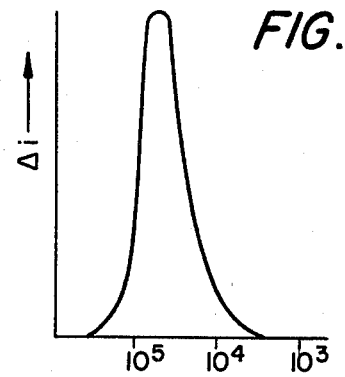
FIG. 4.1
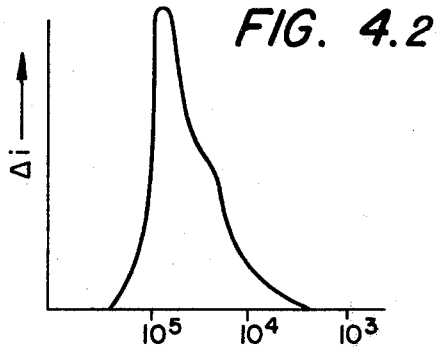
FIG. 4.2
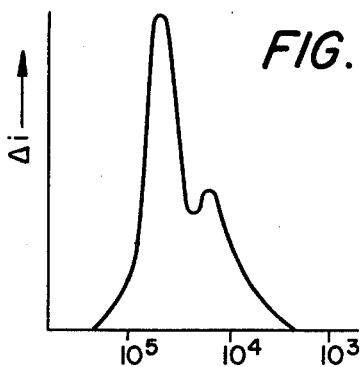
FIG. 4.3
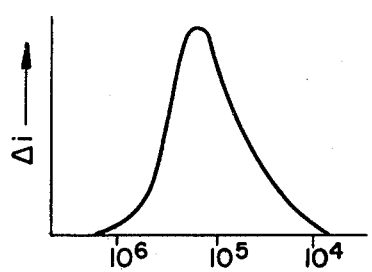
FIG. 5.1
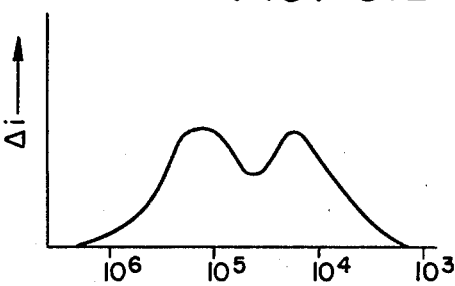
FIG. 5.2

PROCESS FOR PREPARING BIMODAL OR MULTIMODAL POLYMERS OF CONJUGATED DIENES

The object of the present invention is a process which makes it possible to modify the molecular weight distribution upon the synthesis of a homopolymer of a conjugated diene or a copolymer of a conjugated diene with another conjugated diene or with a vinyl aromatic compound.

From French patent applications Nos. 74 19 475, 75 20 007 and 76 04 115 (which correspond to U.S. Pat. Nos. 4,080,492 and 4,092,268; 4,079,176; and 4,129,705, respectively) it is known to prepare a homopolymer of a conjugated diene or a copolymer of a conjugated diene with another conjugated diene or with a vinyl aromatic compound having simultaneously a very low content of 1,2 or 3,4 linkages and a high content of trans-1,4 linkages by means of a catalyst system comprising an organolithium initiator, a barium, strontium or calcium compound and an organometallic compound of a metal of group 2B or 3A of the periodic classification of elements of the Mendeleev Table, and possibly an alkali metal alcoholate.

It is desirable to have means which make it possible to modify and regulate the distribution of the molecular weights of the homopolymer of a conjugated diene or a copolymer of a conjugated diene with another conjugated diene or with a vinyl aromatic compound for a number of industrial uses of these products, since the modification of the molecular weight distribution makes it possible to improve greatly certain properties such as, for instance, the machineability, the cold flow, the raw coherence, the raw tackiness, etc., without penalizing the other properties.

It is known to the man skilled in the art that it is possible to broaden the molecular weight distribution and obtain bimodal or multimodal polymers by mixing together several polymers of different viscosity.

However, such a process has the drawback of requiring the separate synthesis of several polymers of different viscosities, which results in problems of reproducibility of the process, requires very large quantities of catalyst, results in long periods of time and finally makes this process uninteresting both from a technical standpoint and from an economic standpoint.

It is also known to modify the molecular weight distribution of homopolymers and copolymers in processes carried out either batchwise or continuously by breaking up the amount of catalyst necessary and adding it at different times during the course of the homopolymerization or copolymerization. However, such a manner of operation, which also requires very large amounts of catalyst, which are larger the greater the desired broadening of the molecular weight distribution is, is therefore also very expensive. Furthermore, it would be extremely difficult to carry out industrially.

The object of the present invention is to remedy these drawbacks by providing a process which is economically more interesting and which makes it possible easily to modify and regulate the molecular weight distribution during the course of the synthesis of a homopolymer of a conjugated diene or a copolymer of a conjugated diene with another conjugated diene or with a vinyl aromatic compound and to obtain a bimodal or multimodal homopolymer or copolymer.

The applicant has unexpectedly found that it is possible to achieve this purpose when the homopolymerization of the conjugated diene or the copolymerization of the conjugated diene with another conjugated diene or with a vinyl aromatic compound by the use of the catalyst systems described above is effected in the presence of a modifying agent which is not a polymerization initiator.

Thus, the present invention concerns a process of preparing a homopolymer of a conjugated diene or a copolymer of a conjugated diene with another conjugated diene or with a vinyl aromatic compound, whether bimodal or multimodal, which consists in polymerizing the monomer(s) in a reaction medium at a temperature of between 20° C. and 200° C. in the presence of a catalyst system comprising an organolithium initiator, a barium, strontium or calcium compound, and an organometallic compound of a metal of group 2B or 3A of the periodic classification of elements of the Mendeleev Table, characterized by adding to the reaction medium during the course of the polymerization reaction, as a modifying agent which is not a polymerization initiator, a compound of a transition metal of groups 1B to 7B and 8 of the periodic classification of elements of the Mendeleev Table or a magnesium compound of the general formula $Mg(A)_2$ in which A represents an alkyl radical having from 1 to 10 carbon atoms or an alcoholate, phenate, beta-diketonate or carboxylate radical.

The periodic classification of elements of the Mendeleev Table referred to herein is that given in the 59th edition of the "Handbook of Chemistry and Physics".

This proccess makes it possible to modify the molecular weight distribution as desired and to obtain improved properties of raw tackiness, raw coherence and machineability without requiring additional amounts of catalyst and without, at the same time, penalizing the other properties.

The process of the invention makes it possible to obtain homopolymers and copolymers having bimodal or multimodal molecular weight distributions. The fraction or fractions obtained after addition of the modifying agent are of low molecular weight. Furthermore, the average molecular weights of said fraction or fractions of low molecular weight as well as the quantity of these low molecular weights are a function of the nature of the modifying agent, of the amount of the modifying agent added and of the time when this modifying agent is added during the course of the polymerization reaction.

For a given modifying agent it is possible, by selecting the amount to be added and the time of the addition as a function of the percentage of conversion of the monomers at the time in question as compared with the final conversion percentage, to prepare bimodal or multimodal hompolymers and copolymers, the quantity of the high and low molecular weights of which as well as the respective average molecular weights of these high and low molecular weights can be regulated as desired. Although the amount of modifying agent which is necessary depends on the nature of the modifying agent and the extent of the modification of the molecular weight distribution sought, it is desirable to use such amounts thereof that the molar ratio of the modifying agent to the organolithium initiator is between 0.01 and 20.

Depending on the nature of the modifying agent used it is possible, in the fraction of the low molecular weights, either to retain the same microstructure as that of the fraction of high molecular weights which depends completely on the catalyst used, which is true, for instance, when using magnesium dialkyl compounds, or to decrease the percentage of trans-1,4 linkages, which is true, for instance, with compounds of magnesium other than the dialkyl derivatives. Finally, the modifying agent in numerous cases makes it possible to increase the polymerization reaction kinetics even though it is not itself a polymerization initiator.

The modifying agent is added during the course of the polymerization reaction and preferably when the conversion of the monomers is between 20% and 90%. The polymerization process can be conducted in bulk or in solution in a hydrocarbon solvent either batchwise or continuously. In the latter case one operates in two or more reactors placed in series at identical or different polymerization temperatures. Depending on the extent of the effect desired, the modifying agent is added in one or more portions.

As representative examples of the magnesium compounds which can be used as the modifying agent mention may be made of the magnesium dialkyl compounds, such as dioctyl magnesium, di-n-butyl magnesium, di-sec-butyl magnesium, n-butyl sec-butyl magnesium, ethyl sec-butyl magnesium and n-butyl octyl magnesium. Among the magnesium compounds without carbon-metal bond mention may be made of the alcoholates, phenates, beta-diketonates, carboxylates and in particular the ether alcoholates of magnesium having the formula $$Mg[O(CH_2CH_2O)_nR]_2$$

in which R is a lower alkyl radical, such as magnesium ethyl diglycolate. They have the advantage of being soluble in aliphatic and aromatic solvents.

With respect to the compounds of a transition metal which can be used as the modifying agent, compounds of all transition metals can be used regardless of the degree of valence of the transition metal. However, transition metals in the form of organic salts are particularly suitable, especially the alcoholates, phenates, beta-diketonates and carboxylates. Manganese, iron, cobalt in CoII form, copper in CuI form, zinc and nickel are preferably used as the transition metal.

By "organolithium initiator" there is understood, first of all, any organometallic compound having one or more carbon-lithium bonds, secondly, any radical-ion adduct of lithium and of certain polynuclear aromatic hydrocarbons, thirdly, metallic lithium itself and, finally, the oligomers produced by the addition of lithium to conjugated dienes or substituted styrenes.

As representative examples of the organolithium initiator the following compounds may be cited.

The aliphatic organolithiums such as ethyl lithium, n-butyl lithium, isobutyl lithium, sec-butyl lithium, tert.-butyl lithium, isopropyl lithium, n-amyl lithium, isoamyl lithium; the alkenyl organolithiums such as allyl lithium, propenyl lithium, isobutenyl lithium, the "living" polybutadienyl lithium, polyisoprenyl lithium and polystyryl lithium polymers; the dilithium polymethylenes such as 1,4-dilithiobutane, 1,5-dilithiopentane, 1,20-dilithioeicosane; the aromatic organolithiums such as benzyl lithium, phenyl lithium, and 1,1-diphenyl methyl lithium; the polylithiums resulting from the reaction of metallic lithium with aryl-substituted ethylene compounds such as 1,1-diphenylethylene, transstilbene and tetraphenylethylene; the radical ions such as lithium naphthalene, lithium anthracene, lithium chrysene and lithium diphenyl, as well as the derivatives substituted by one or more alkyls.

By "a barium, strontium or calcium compound" there are understood the hydrides $BaH_2$, $SrH_2$ and $CaH_2$, the mono- or polyfunctional organic acid salts of formulas $(R-COO)_2Ba$ or $Sr$ or $Ca$, or $R^1-(COO)_2Ba$ or $Sr$ or $Ca$ in which R and $R^1$ are organic radicals, the first monovalent and the second divalent, having no other functions capable of inactivating the organolithium initiator, and the corresponding thio acids, as well as the mono- or polyfunctional alcoholates and the corresponding thiolates; the mono- or polyfunctional phenates and the corresponding thiophenates; the salts of alcohol acids and phenol acids of barium, strontium or calcium such as the reaction products of barium, strontium or calcium with acetyl acetone, dibenzoylmethane, thenoyltrifluoro acetone, benzoyltrifluoro acetone and benzoyl acetone; the organic derivatives of barium, strontium or calcium such as those of 1,1-diphenylethylene, 1,2-acenaphthylene, tetraphenylbutane, α-methylstyrene or else those such as diphenyl barium, strontium or calcium, barium, strontium or calcium bis-cyclopentadienyl, the barium, strontium or calcium trialkylsilyls and barium, strontium or calcium triphenylsilyls; the mixed organic derivatives such as phenyl barium iodide and methyl strontium iodide or methyl calcium iodide, the barium, strontium or calcium salts of the secondary amines; the ketonic metals such as barium, strontium or calcium benzophenone, barium, strontium or calcium cinnamone and the corresponding alkyl products as well as the sulfur homologs; the radical ions of barium, strontium and calcium such as those of naphthalene, anthracene, chrysene, diphenyl, etc.

As representative examples of organometallic compounds of group 2B or 3A there may be mentioned:

the zinc or cadmium dialkyls such as diethyl zinc, diethyl cadmium; the halogenated or nonhalogenated organoaluminums such as triethyl aluminum, triisobutyl aluminum, diethyl aluminum chloride, ethyl aluminum dichloride, ethyl aluminum sesquichloride, methyl aluminum sesquichloride; the dialkyl aluminum hydrides such as diethyl aluminum hydride, diisobutyl aluminum hydride, etc.

The barium, strontium or calcium compounds as well as the organometallic compounds of group 2B or 3A may be present in the form of a single compound having one of the following formulas:

$$M^1(M^3R^1R^2R^3R^4)_2$$

$$M^1M^2(R^1)_4$$

in which $M^1$ represents barium, strontium or calcium, $M^3$ represents a metal of group 3A, $M^2$ represents a metal of group 2B of the periodic classification of elements of the Mendeleev Table and $R^1$, $R^2$, $R^3$ represent an alkyl or aralkyl radical, and $R^4$ represents either an alkyl or aralkyl radical or a radical XB in which X represents an oxygen, sulfur or nitrogen atom and B represents either an alkyl or aralkyl radical or a radical $M^3(R^5R^6)$ in which $R^5$, $R^6$ represent an alkyl or aralkyl radical.

The homopolymerization or copolymerization can also be carried out by means of the catalyst system described above which furthermore contains an alkali metal alcoholate and more particularly an alcoholate having one of the following two formulas:

R(OCH$_2$CH$_2$)$_n$OM'

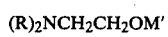

(R)$_2$NCH$_2$CH$_2$OM' in which M' represents an alkali metal such as lithium, sodium or potassium and R represents an alkyl radical and n a whole number.

As hydrocarbon solvent use may be made of aliphatic solvents, such as hexane and heptane, or aromatic solvents, such as benzene and toluene.

The process of the invention is suitable in particular for the homopolymerization of a conjugated diene or the copolymerization of a conjugated diene with another conjugated diene or with a vinyl aromatic compound.

As representative examples of conjugated dienes mention may be made of butadiene-1,3, isoprene, 2,3-dimethylbutadiene-1,3, pentadiene-1,3, 2-methyl-pentadiene-1,3 and 2,4-hexadiene.

As representative examples of vinyl aromatic compounds there are suitable, in particular, styrene, ortho-, meta- or para-methylstyrene, "vinyl toluene", the di- and poly-methylstyrenes, p-tertiobutylstyrene, the vinyl naphthalenes, the methoxystyrenes, the halostyrenes, vinyl mesitylene and divinyl benzene.

The following nonlimitative examples are given by way of illustration of the invention. In these examples of inherent viscosities are establishes at 25° C. in a 1 g./liter solution in toluene; the concentrations of compunds constituting the catalyst system and the modifying agent are expressed in micromols per 100 g. of monomers. The percentages of 1,2 and trans linkages are expressed with reference to the polybutadiene portion and the percentage of styrene is expressed with reference to the total amount of copolymer obtained.

The time elapsed between the start of the polymerization reaction and the moment when the modifying agent is added is designated in the examples as "elapsed time" and the percentage of conversion reached at the time of the addition of the modifying agent is designated "% conv."

BRIEF DESCRIPTION OF THE DRAWINGS

The figures of the drawing show the distribution of the molecular weights of the homopolymers or copolymers obtained at the end of the polymerization reaction which was obtained by gel permeation chromatography. The molecular weights are shown on the abscissa and the refraction index difference $\Delta i$ on the ordinate.

EXAMPLE 1

Two tests were carried out. 100 ml. of toluene as solvent and 17.5 g. of monomers comprising 77% by weight butadiene and 23% by weight styrene were introduced into 250 ml. Steinie bottles under nitrogen pressure. The catalyst system comprising:

1. the cocatalyst preformed during 30 minutes by reaction between barium ethyl diglycolate, Ba[O(CH$_2$CH$_2$O)$_2$Et]$_2$ and tri-isobutyl aluminum, Al i-Bu$_3$,
2. butyl lithium, BuLi, was then added in the order indicated. The bottles were placed in a tank maintained thermostatically at 75° C. in which they were agitated.

In the second test, n-butyl sec-butyl magnesium was added during the course of the polymerization reaction at the time indicated in Table I. After an hour all the polymerizations were stopped by addition of methanol and the copolymer was recovered in conventional manner.

The results are set forth in Table I and in FIGS. 1.1-1.2.

It is noted that:

the addition of R$_2$Mg contributes to increasing the reaction velocity and decreasing the viscosity of the resultant copolymer without modifying the microstructure of the copolymer and to producing a molecular weight distribution of bimodal type.

EXAMPLE 2

Two tests were carried out reproducing the operating conditions of Example 1 except that magnesium ethyl diglycolate, Mg[O(CH$_2$CH$_2$O)$_2$Et]$_2$, which is soluble in aliphatic and aromatic solvents, was used as the modifying agent.

After an hour all the polymerizations were stopped by addition of methanol and the copolymer was recovered in conventional manner.

The results obtained are set forth in Table II and in FIGS. 1.1 and 2.1.

EXAMPLE 3

Four tests were carried out. 100 ml. of heptane as solvent and 13.6 g. of butadiene were introduced into 250 ml. Steinie bottles under pressure of rectified nitrogen. The catalyst system comprising:

1. the cocatalyst preformed during 30 minutes by reaction between barium nonylphenate, Ba(OR)$_2$, and triethyl aluminum, AlEt$_3$,
2. butyl lithium, BuLi,
3. lithium ethyl diglycolate, Et(OCH$_2$CH$_2$)$_2$OLi was then added in the order indicated.

The bottles were placed in a tank maintained thermostatically at 80° C. in which they were agitated.

During the course of the polymerization reaction either di-sec-butyl magnesium, R$_2$Mg, or magnesium ethyl diglycolate, Mg(OR)$_2$, which is soluble in aliphatic and aromatic solvents, was added to certain bottles.

After one and a half hours all the polymerizations were stopped by the addition of methanol and the homopolymer was recovered in conventional manner.

The results are set forth in Table III and in FIGS. 3.1-3.4.

It is noted that the addition of the magnesium compounds makes it possible to create low molecular weights. The bimodal polybutadiene obtained in Test 3 is characterized by 65% of high molecular weights of average viscosity close to 1.9 and by 35% of a fraction of low molecular weights of an average viscosity of 0.7. The microstructure of the fractions of high and low molecular weights is 1,2: 3.8%; trans: 81%; 1,2: 4%; trans: 80%; respectively.

EXAMPLE 4

Three tests were carried out. 100 ml. of heptane and 17.5 g. of butadiene were introduced into 250 ml. Steinie bottles under the pressure of rectified nitrogen. The catalyst system comprising:

1. the cocatalyst Ba[AlEt$_4$]$_2$,
2. the organolithium initiator BuLi was then added in the order indicated.

The bottles were placed in a tank maintained thermostatically at 80° C. in which they were agitated.

n-butyl octyl magnesium was added to certain bottles during the course of the polymerization reaction. After an hour all the polymerizations were stopped by the addition of methanol and the homopolymer was recovered in conventional manner.

The results are set forth in Table IV and in FIGS. 4.1–4.3.

Copper tertiobutanolate was added in Test 2 during the course of the polymerization reaction. After three and a half hours all the polymerizations were stopped by the addition of methanol and the homopolymer was recovered in conventional manner.

The results are set forth in Table V and in FIGS. 5.1–5.2.

TABLE I

| | Catalyst System | | | Addition of $R_2Mg$ | | | % Final Conversion | Copolymer | | | | Drawing FIG. |
|---|---|---|---|---|---|---|---|---|---|---|---|---|
| Test | $AlR_3$ | $Ba(OR)_2$ | BuLi | Elapsed Time | % Conv. at Elapsed Time | Amount | | Viscosity | % 1,2 | % trans. | % Styrene | |
| 1 | 2000 | 500 | 1500 | | | | 83 | 1.52 | 5 | 79 | 10 | 1.1 |
| 2 | 2000 | 500 | 1500 | 15 min. | 54 | 500 | 90 | 1.02 | 5 | 79 | 12 | 1.2 |

TABLE II

| | Catalyst System | | | Addition $Mg(OR)_2$ | | | % Final Conversion | Copolymer | | | | Drawing FIG. |
|---|---|---|---|---|---|---|---|---|---|---|---|---|
| Test | $AlR_3$ | $Ba(OR)_2$ | BuLi | Elapsed Time | % Conv. at Elapsed Time | Amount | | Viscosity | % 1,2 | % trans. | % Styrene | |
| 1 | 2000 | 500 | 1500 | | | | 85 | 1.5 | 5 | 79 | 11 | 1.1 |
| 2 | 2000 | 500 | 1500 | 15 min. | 50 | 250 | 80 | 1.2 | 5.5 | 78 | 10 | 2.1 |

TABLE III

| | Catalyst System | | | | | | Addition of $R_2Mg$ or $Mg(OR)_2$ | | % Final Conversion | Homopolymer | | | Drawing FIG. |
|---|---|---|---|---|---|---|---|---|---|---|---|---|---|
| Test | $Ba(OR)_2$ | $AlEt_3$ | BuLi | ROLi | Elapsed Time | % Conv. at Elapsed Time | Amount $R_2Mg$ | Amount $Mg(OR)_2$ | | Viscosity | % 1,2 | % trans. | |
| 1 | 370 | 1480 | 1110 | 740 | | | | | 98 | 2.02 | 3.5 | 82 | 3.1 |
| 2 | 370 | 1480 | 1110 | 740 | 25 min. | 55 | 370 | | 98 | 1.63 | 4 | 80 | 3.2 |
| 3 | 370 | 1480 | 1110 | 740 | 25 min. | 55 | 740 | | 98 | 1.48 | 4 | 80 | 3.3 |
| 4 | 370 | 1480 | 1110 | 740 | 25 min. | 55 | | 370 | 77 | 1.70 | 4 | 80 | 3.4 |

TABLE IV

| | Catalyst System | | Addition of $R_2Mg$ | | | % Final Conversion | Homopolymer | | | Drawing FIG. |
|---|---|---|---|---|---|---|---|---|---|---|
| Test | $Ba[AlEt_4]_2$ | BuLi | Elapsed Time | % Conv. at Elapsed Time | Amount | | Viscosity | % 1,2 | % trans. | |
| 1 | 686 | 686 | | | | 73 | 1.16 | 3.8 | 79 | 4.1 |
| 2 | 686 | 686 | 12 min. | 35 | 343 | 77 | 0.82 | 3.9 | 79 | 4.2 |
| 3 | 686 | 686 | 12 min. | 35 | 686 | 60 | 0.70 | 3.9 | 79 | 4.3 |

TABLE V

| | Catalyst System | | | Addition of CuI Salt | | | % Final Conversion | Homopolymer | | | Drawing FIG. |
|---|---|---|---|---|---|---|---|---|---|---|---|
| Test | $Ba(OR)_2$ | $AlEt_3$ | BuLi | Elapsed Time | % Conv. at Elapsed Time | Amount | | Viscosity | % 1,2 | % trans. | |
| 1 | 571 | 2571 | 2285 | | | | 70 | 2.6 | 3.5 | 71 | 5.1 |
| 2 | 571 | 2571 | 2285 | 90 min. | 35 | 30 | 75 | 1.8 | 3.5 | 78 | 5.2 |

The addition of $R_2Mg$ makes it possible to obtain low molecular weights.

EXAMPLE 5

Two tests were carried out. 100 ml. of toluene as solvent and 17.5 g. of butadiene were introduced into 250 ml. Steinie bottles under nitrogen pressure. The preformed catalyst system comprising the organolithium initiator, n-butyl lithium (BuLi), the cocatalyst comprising a mixture of triethyl aluminum and barium ethyl diglycolate was then added.

The bottles were placed in a tank maintained thermostatically at 55° C. in which they were agitated.

What is claimed is:

1. A process of preparing a bimodal or multimodal homopolymer of a conjugated diene or a bimodal or multimodal copolymer of a conjugated diene with another conjugated diene or with a vinyl aromatic compound, consisting in polymerizing the monomer(s) in a reaction medium at a temperature of between 20° C. and 200° C. in the presence of a catalyst system comprising an organolithium initiator, a barium, strontium or calcium compound, and an organometallic compound of a metal of group 2B or 3A of the periodic classification of elements of the Mendeleev Table, characterized by adding to the reaction medium during the course of the polymerization reaction, as a modifying agent which is not a polymerization initiator, a compound of a transition metal of groups 1B to 7B and 8 of the periodic classification of the elements of the Mendeleev Table or a magnesium compound of the general formula MG (A)$_2$ in which A represents an alkyl radical having from 1 to 10 carbon atoms or an alcoholate, phenate, beta-diketonate or carboxylate radical.

2. A process according to claim 1, characterized by the fact that the compound of the transition metal is an alcoholate, phenate, beta-diketonate or carboxylate.

3. A process according to claim 2, characterized by the fact that the compound of the transition metal is copper tertiobutanolate.

4. A process according to claim 1, characterized by the fact that the modifying agent is selected from among ethyl sec-butyl magnesium, n-butyl sec-butyl magnesium and n-butyl octyl magnesium.

5. A process according to claim 1, characterized by the fact that the modifying agent is magnesium ethyl diglycolate.

6. A process according to claim 1, characterized by the fact that the modifying agent is added in such amount that the molar ratio of the modifying agent to the organolithium initiator is between 0.01 and 20.

7. A process according to claim 2, characterized by the fact that an alkali metal alcoholate is added to the initial catalyst system.

8. A process according to claim 7, characterized by the fact that the alkali metal alcoholate has one of the formulas $R(OCH_2CH_2)_nOM'$ or $(R)_2NCH_2CH_2OM'$ in which M' represents an alkali metal, R an alkyl radical and n a whole number.

9. A process according to claim 1, characterized by the fact that the polymerization is conducted in a hydrocarbon solvent.

10. A process according to claim 1, characterized by the fact that the polymerization is conducted continuously.

* * * * *